(12) United States Patent
Ram

(10) Patent No.: US 9,553,916 B2
(45) Date of Patent: Jan. 24, 2017

(54) COPY AND PASTE BETWEEN DEVICES

(71) Applicant: CA, Inc., Islandia, NY (US)

(72) Inventor: Jaimini Ram, Bangalore (IN)

(73) Assignee: CA, Inc., Islandia, NY (US)

( * ) Notice: Subject to any disclaimer, the term of this patent is extended or adjusted under 35 U.S.C. 154(b) by 261 days.

(21) Appl. No.: 14/208,849

(22) Filed: Mar. 13, 2014

(65) Prior Publication Data
US 2015/0261414 A1 Sep. 17, 2015

(51) Int. Cl.
*G06F 17/00* (2006.01)
*G06K 7/10* (2006.01)
*G06K 9/18* (2006.01)
*H04L 29/08* (2006.01)

(52) U.S. Cl.
CPC ....................... *H04L 67/06* (2013.01)

(58) Field of Classification Search
USPC ..... 235/375, 462.08, 462.09, 462.01, 462.45
See application file for complete search history.

(56) References Cited

U.S. PATENT DOCUMENTS

| | | | |
|---|---|---|---|
| 9,122,334 B1* | 9/2015 | Olsen | G06F 3/03545 |
| 2005/0174601 A1* | 8/2005 | Sawada | G03G 15/507 |
| | | | 358/1.15 |
| 2007/0204164 A1* | 8/2007 | Cattrone | H04N 1/32101 |
| | | | 713/176 |
| 2008/0141117 A1* | 6/2008 | King | G06F 17/30011 |
| | | | 715/238 |
| 2010/0020970 A1* | 1/2010 | Liu | G06K 7/1093 |
| | | | 380/255 |
| 2011/0128566 A1* | 6/2011 | Eum | H04N 1/00846 |
| | | | 358/1.14 |
| 2011/0161674 A1* | 6/2011 | Ming | G06F 21/64 |
| | | | 713/181 |
| 2011/0202971 A1* | 8/2011 | Margolin | H04L 67/10 |
| | | | 726/3 |
| 2012/0081317 A1* | 4/2012 | Sirpal | G06F 1/1616 |
| | | | 345/173 |
| 2013/0333015 A1* | 12/2013 | Reynolds | H04L 63/0861 |
| | | | 726/7 |
| 2014/0067915 A1* | 3/2014 | Choi | H04L 67/06 |
| | | | 709/203 |

(Continued)

OTHER PUBLICATIONS

"Dynamic 2D-barcodes for multi-device Web session migration including mobile phones", [Online]. Retrieved from the Internet: <URL: http://dl.acm.org/citation.cfm?id=1713535&bnc=1>, (Accessed Jan. 21, 2014), 2 pgs.

(Continued)

*Primary Examiner* — Tuyen K Vo
(74) *Attorney, Agent, or Firm* — Gilliam IP PLLC

(57) ABSTRACT

Generally discussed herein are systems and methods for transferring content from one device to another device. In one more embodiments an apparatus can include a first module to detect a request to perform a copy operation has been issued, receive content that was selected at a time the request to perform the copy operation was issued, or automatically create a machine-decodable image of the selected content in response to detecting the request, wherein the machine-decodable image includes the selected content encoded therein. The apparatus can include a display coupled to the first module to show the machine-decodable image.

8 Claims, 6 Drawing Sheets

(56) References Cited

U.S. PATENT DOCUMENTS

2014/0254796 A1* 9/2014 Li ........................ H04L 9/3247
                                                              380/246
2014/0267339 A1* 9/2014 Dowd ................... G06F 3/0414
                                                              345/581
2014/0359441 A1* 12/2014 Lehtiniemi ....... G06F 17/30265
                                                              715/716

OTHER PUBLICATIONS

"FAQ—MobileCopyPaste.com", [Online]. Retrieved from the Internet: <URL: http://www.mobilecopypaste.com/index.php?action=faq>, (Accessed Jan. 21, 2014), 1 pg.

* cited by examiner

COPY AND PASTE BETWEEN DEVICES

BACKGROUND

Mobile devices, such as laptops, smart phones, Personal Digital Assistants (PDAs), or tablets can communicate to each other using a variety of communication protocols. The communication protocols can allow communications to be sent from one mobile device to another using text messaging, a phone call, email, or audio.

BRIEF SUMMARY

An apparatus can include a first module to detect a request to perform a copy operation was issued, receive content that was selected at a time the request to perform the copy operation was issued, or create a machine-decodable image of the selected content in response to detecting the request was issued, wherein the machine-decodable image includes the selected content encoded therein. The apparatus can include a display coupled to the first module to show the machine-decodable image.

A technique can include (1) detecting a request to perform a copy operation has been issued, (2) receiving content that was selected at a time the request to perform the copy operation was issued, (3) creating a machine-decodable image of the selected content in response to detecting the request, wherein the machine-decodable image includes the selected content encoded therein, or (4) displaying the machine-decodable image.

A computer program product can include a computer readable storage medium having computer readable program code embodied therewith, the computer program code including computer readable program code configured to (1) detect a request to perform a copy operation has been issued, (2) receive content that was selected at a time the request to perform the copy operation was issued, or (3) create a machine-decodable image of the selected content in response to detecting the request, wherein the machine-decodable image includes the selected content encoded therein.

A system can include a first apparatus to couple to a Local Area Network (LAN), the first apparatus including a web server running thereon and a first memory with first instructions stored thereon, the first instructions, which when executed by a first processor coupled to the first memory, cause the first processor to perform operations comprising detecting that a request to perform a copy operation was issued, receiving content that was selected when the request to perform the copy operation was issued, or publishing the selected content to the web server in response to detecting that the request to perform the copy operation was issued.

BRIEF DESCRIPTION OF THE DRAWINGS

Aspects of the present disclosure are illustrated by way of example and are not limited by the accompanying FIGS. with like references indicating like elements.

DETAILED DESCRIPTION

Figure 1:
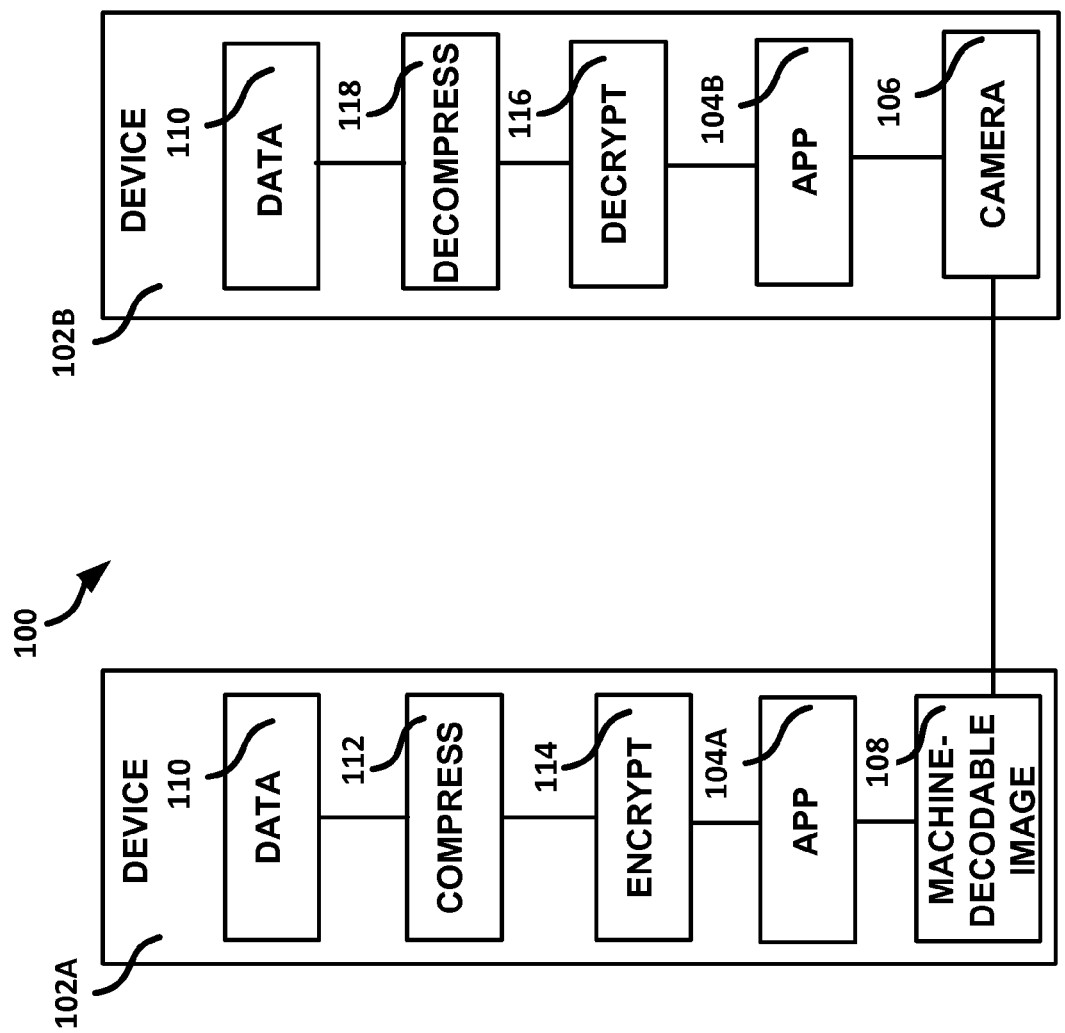
FIG. 1 illustrates a block diagram of an example of a system for transferring content between devices.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or in a combination of software and hardware that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of techniques, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

A device user can encounter a situation in which it can be advantageous to transfer data from a first device to a second device, such as from or to a device (e.g., a mobile device, such as a cellular phone, smart phone, laptop, tablet, PDA, or the like). Data can be transferred from one device to another through email, but such a transfer requires a server intermediate to the two devices to receive and store the email such that the second device can retrieve the email from the server to access the information in the email. Other similar solutions to the transfer of data between the two devices can use an intermediate server. For example, sending data using a text message (e.g., Short Messaging Service (SMS), Enhanced Messaging Service (EMS), and Multimedia Messaging Service (MMS)) includes an intermediate server between devices that are sending or receiving a text.

One or more embodiments discussed herein can transfer content (e.g., data, such as binary data) from one device to another without the use of an intermediate server, an internet connection, or any server, in the transfer process. One or more embodiments accomplish this by detecting when a request to perform a copy operation has been issued, receiving content that was selected at the time the request to perform the copy operation issued, and either publishing the data to a server running on a device or producing a machine-decodable image of the data and displaying the image on the device, thus providing access to the data.

One or more embodiments discussed herein can transfer content (e.g., data) from one device to another without saving any of the content to be transferred on a device, such as a server or other device with a memory that is intermediate to the sending or receiving device. Such embodiments can be useful when security of the content is a concern, such as by ensuring that no copy of any of the content is saved or otherwise accessible on the intermediate device. Another advantage of one or more embodiments discussed herein can include reducing the amount of time it takes to receive the content at the receiving device as compared to a configuration that includes an intermediate device. The increased speed can be from removing a latency associated with the intermediate device.

One or more embodiments can transform a copy-paste paradigm that copies content from one location on one device to another location on that same device to one that can copy content on one device and paste content to another device. The copy and paste can be accomplished, such as by selecting content, requesting that a copy operation be performed (e.g., by activating a specified combination of one or more keys (e.g., "Ctrl" and "c") of a keyboard (e.g., a virtual keyboard or a keyboard with physical keys) or right clicking and selecting "copy, among others). Then another device can request a paste operation be performed (e.g., by activating another specified combination of one or more keys (e.g., "Ctrl" and "v") of another keyboard or right clicking and selecting paste, among others) and the content that was selected on the first device can be pasted into the second device.

FIG. 1 is a block diagram of a system 100 configured to transfer content from one device 102A to another device 102B, such as by copying content using the device 102A and pasting the content to the device 102B. The system can include two devices 102A-B. The device 102A-B can be a smart phone, laptop computer, desktop computer, PDA, tablet, or other device capable of executing an application 104A or 104B (e.g., a module) installed thereon. The device 102A can include a compression module 112 or an encryption module 114. The device 102B can include a camera 106, a decryption module 116, or a decompression module 118. The camera 106 can be capable of taking a picture of a machine-decodable image 108. The picture taken by the camera 106 can be of sufficient clarity so that the application 104B can extract information from the machine-decodable image, such as to decode the machine-decodable image. The picture taken by the camera can be of sufficient clarity to distinguish variations in pictures of different machine-decodable images 108. The application 104B can include a decoder module to translate or decode the machine-decodable image into content.

The application 104A can provide a user the ability to encode content 110 in the machine-decodable image 108. The application 104A can receive selected content and create a machine-decodable image 108 with the content 110 encoded therein, such as automatically, such as in response to receiving a signal indicating a request to perform a copy operation was issued, such as in response to intercepting or detecting a request to perform a copy operation was issued. The application 104A-B can receive the content 106 and create the machine-decodable image 108 so that the content is encoded in the machine-decodable image 108. The application 104A can detect when a user has activated a specified combination of keys on a keyboard or keypad of the device 102A and (e.g., automatically, such as without human interference) create the machine-decodable image 108 with the content 110 embedded therein. The content 110 can be content that was selected at the time the specified combination of keys was detected as being activated, or the time a request to perform a copy operation was issued.

The application 104B can take a picture as an input, such as a picture of the machine-decodable image 108 taken by the camera 106. The application 104B can decode the machine-decodable image 108 so as to determine the content 110 that is embedded in the machine-decodable image 108. The content 110 can be output by the application 104B. Another application (an application other than the application 104B) of the device 102B can then use the content 110. The application 104B can detect when a user activates a specified combination of one or more keys. In response to detecting that the specified combination of keys has been activated, the device 102B and (e.g., automatically) take a picture of the machine-decodable image 108, such as by using the camera 106.

The machine-decodable image 108 can include a Quick Response (QR) code or a two dimensional bar code with selected content embedded therein. The machine-decodable image 108 can include a graphical representation of selected content with selected content encoded therein. The machine-decodable image 108 can be of sufficient quality to be photographed by a device, such that the photograph can be decoded by the device, such as to provide the selected content to the device that took the photograph of the machine-decodable image 108.

The content 110 can be content that is capable of being embedded in a machine-decodable image. The content 110 can be numeric, alphanumeric, binary, or other content. The content 110 can include text data, image data, application data, or other data. The content 110, in one or more embodiments, can be distinct from a file in that the content can be a portion of a file, such as without the metadata associated with the file. The content 110 can be automatically inserted into a file or application that is open or operating on the device that took the photograph. The content 110 can be inserted into a location in the file or application that is selected by a user of the device 102B.

The content 110 can be compressed, such as by using the compression module 112. The content 110 can be compressed before the content 110 is sent to the application 104A. The compression module 112 can be configured to implement a compression technique on the content 110. The compression technique can be a lossless compression technique. The compression technique can include Lempel-Ziv compression, Lempel-Ziv-Welch compression, Lempel-Ziv-Renau compression (e.g., ZIP compression), Burrows-Wheeler compression, Huffman code compression, or other compression technique. In one or more embodiments, the compression technique implemented by the compression module 112 can be chosen as a function of the type of content 110 to be compressed. For example, if the content 110 is determined to be music content, the compression module 112 can perform an audio compression technique, such as Free Lossless Audio Codec (FLAC), MP3, or other audio compression technique. In other embodiments, if the content 110 is determined to be text content, the compression module 112 can perform a compression technique that is better suited for text content (e.g., that compresses text better than other compression techniques). Such compression techniques include Lempel-Ziv or variations thereof. A variety of compression techniques are known and their effectiveness at compressing specific types of content is generally known. Those skilled in the art will appreciate that these techniques can be implemented using the compression module 112.

By compressing the content 110 before creating a machine-decodable image 108, more content can effectively be embedded in the machine-decodable image 108 than would be allowed without compression. The size of the compressed content 110 can be compared to the threshold so as to determine if the compressed content 110 needs multiple machine-decodable images 108 in order to transfer or paste the compressed content 110 to the device 102B.

The device 102A can be configured to encrypt the content 110, such as by using the encryption module 114. The device 102A can encrypt the content 110 before compressing the content 110. That is, an output of the encryption module 114 can be coupled to an input of the compression module 112. By encrypting the content 110 before embedding the content 110 in the machine-decodable image 108, the content 110 becomes more secure. A device 102B that does not have the decryption key will (generally) not be able to determine what the content 110 is.

The device 102B can be configured to decrypt the content produced by the application 104B, such as by using the decryption module 116. The decryption module 116 can include the decryption key or can be configured to determine the decryption key for decrypting the content embedded in the machine-decodable image 108 or extracted by the application 104B.

Figure 2:
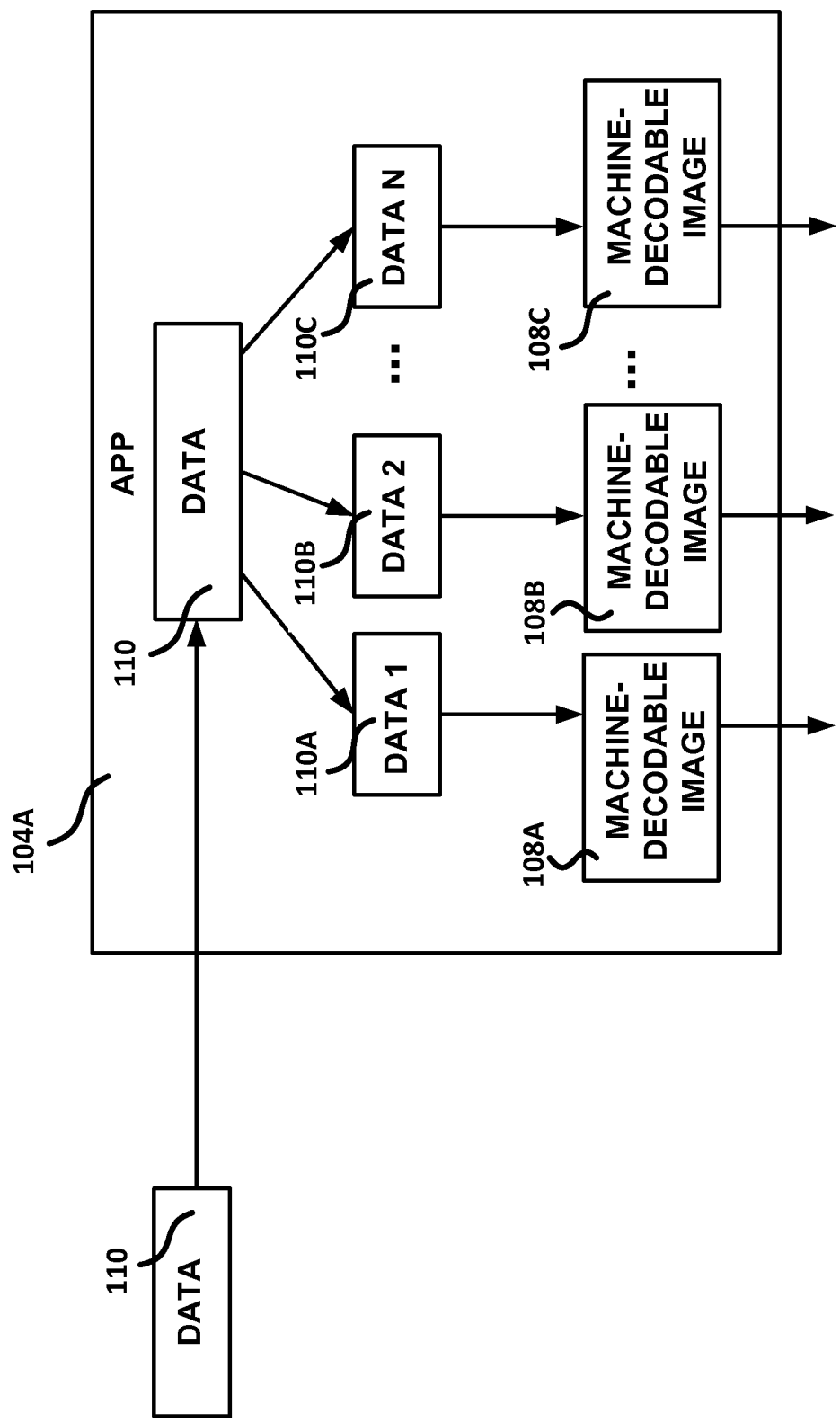
FIG. 2 illustrates a block diagram of another example of a system for transferring content between devices.

FIG. 2 shows a block diagram of an example of the application 104A that can copy and paste content 110 that includes more content than can be embedded in a single machine-decodable image 108. The application 104A can receive the content 110. The application 104A can determine whether the content 110 can be embedded in a single machine-decodable image 108, such as by determining if the amount of content 110 is less than (or equal to) a threshold. The threshold can be the maximum amount of content that can be embedded in a single machine-decodable image 108. The threshold can indicate a maximum amount of content that can be embedded in the machine-decodable image minus an amount of extra data (e.g., metadata) that is to be included with the content 110. The metadata can indicate to the application 104B a data type of the content (e.g., text, script or executable, Portable Data Format (PDF) data, word processing data, etc.), who authored the content 110, when the content 110 was created or last modified, a program that was used to create the content 110, an index indicating which chunk of content the machine-decodable image 108 has embedded therein, or other metadata.

If the size of the content 110 is greater than the threshold, it can be split into multiple chunks of content 110A, 110B, or 110C. Each chunk of content 110A-C can be capable of being embedded in a single machine-decodable image 108. Note that extra content can be included in one chunk of content 110A-C and no other chunks of content, so as to only take up space in one chunk of content 110A-C and allow more space in the machine-decodable image 108 for content that is not extra content. In one or more embodiments, each machine-decodable image 108A, 108B, or 108C can include metadata indicating what chunk of content 110A-C the machine-decodable image 108A-C has embedded therein (e.g., an index). In such embodiments, the application 104B can use metadata to ascertain how the content 110A-C is organized, such as to be able to recreate the content 110.

Figure 3:
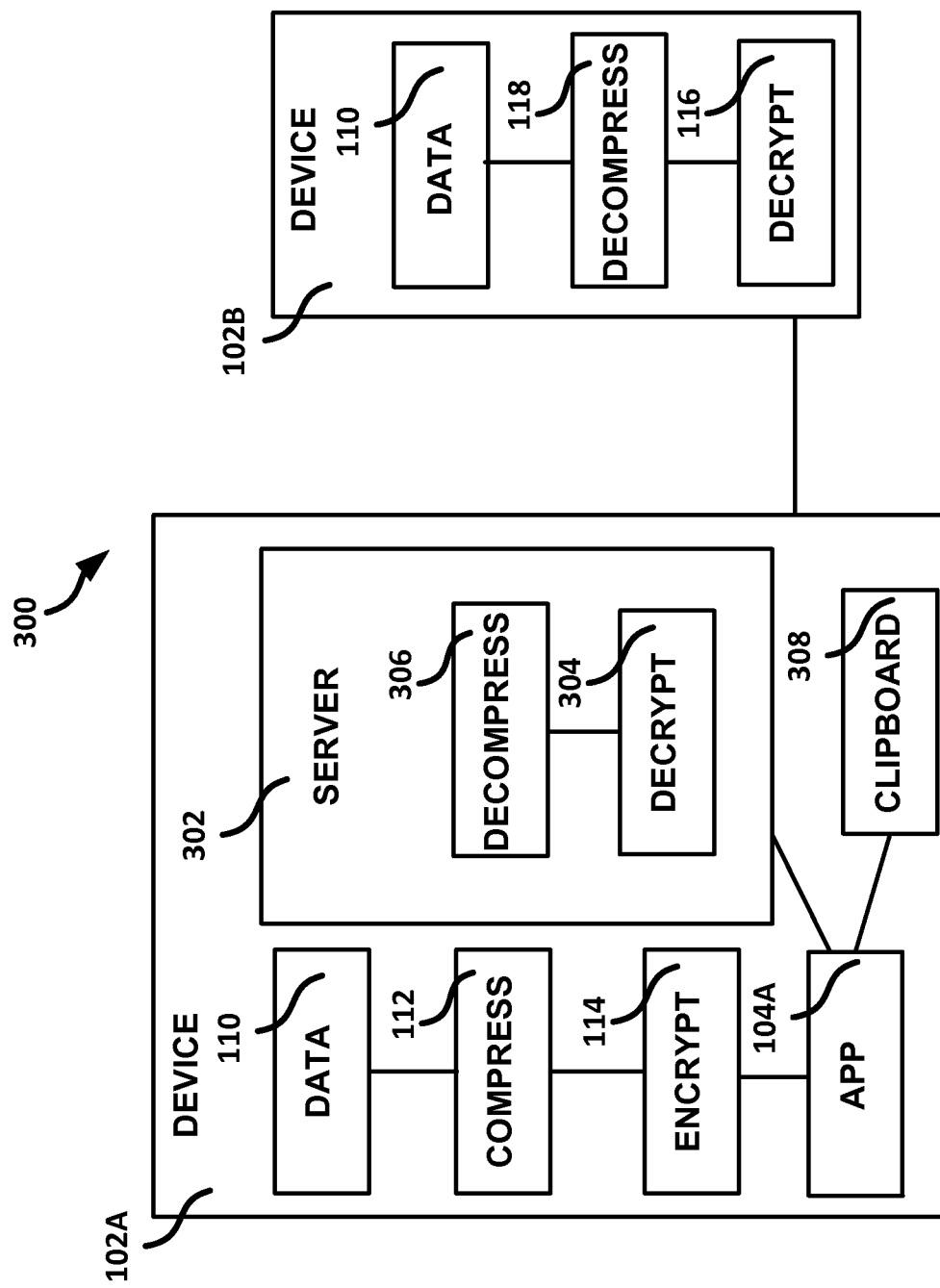
FIG. 3 illustrates a block diagram of another example of a system for transferring content between devices.

FIG. 3 shows an example of a system 300 for copying content from the device 102A and pasting the content to the device 102B. The device 102A can copy the content 110, such as to a clipboard 308 (e.g., a memory) of the device 102A. The content 110 can be compressed, such as by using the compression module 112, or encrypted, such as by using the encryption module 114. The content 110 (e.g., compressed or encrypted content) can be accessed or received by the application 104A. The application 104A can publish the content to a web server 302 running on the device 102A (e.g., through the application 104A), such as in response to detecting that a request to perform a copy operation has issued (e.g., by receiving a signal indicating the copy operation was requested, intercepting a request to perform the copy operation, or detecting a specified combination of keys has been activated on the device 102A).

The web server 302 can be a part of the application 104A. The web server 302 can be a File Transfer Protocol (FTP), HyperText Transfer Protocol (HTTP), HTTP Secure (HTTPS), or other transfer protocol based web server. Using an HTTPS protocol can provide additional security for the content published to the web server 302. The application 104A or 104B can display to a user a Universal Resource Locator (URL), on which the web server 302 is accessible, such as over a LAN (e.g., a WiFi network). The device 102B can use the URL to access the content 110 published to the web server 302. The application 104B can retrieve (e.g., automatically) the URL from the device 102A (e.g., through the application 104A or the web server 302), such as in response to detecting a request to perform a paste operation has been issued (e.g., by receiving a signal indicating the paste operation was requested, intercepting a request to perform the paste operation, or detecting a specified combination of keys has been activated on the device 102B (e.g., "Ctrl" and "v"). The application 104B can retrieve (e.g., automatically) the content published to the web server 302 in response to detecting the request to perform a paste operation.

In one or more embodiments, the web server 302 or application 104A can send a request to the device 102A in response to the device 102B trying to access the content published to the server 302. The device 102A (e.g., the application 104A or the web server 302) can transmit an acknowledge signal or packet to confirm that the device 102B has permission to access the published content or a negative acknowledge to deny the device 102B access to the published content. In one or more embodiments, the server 302 or application 104A can include a permission list stored thereon or can otherwise have access to the permission list. The permission list can be associated with specific published content. The permission list can detail what device or user has permission to access the published content or which devices do not have permission to access the published content.

The server 302 can be a part of a private network that is accessible by the device 102A, thus an internet connection may not be needed to publish the content to the server 302. If the server 302 is a part of a network that is accessible by the device 102B, an internet connection may not be needed for the device 102B to access the content published to the server 302. These operations could be performed over the network connection instead of over the internet. The network can be a private network, such as a home network or a Local Area Network (LAN). The device 102A can allow a device that is part of the network and within range of the network to paste content put on the clipboard 308 of the device 102A to the other device.

As used herein, internet means a computer network consisting of a worldwide network of computer networks. (e.g., Wide Area Networks (WANS)). The internet typically uses a Transfer Control Protocol/Internet Protocol (TCP/IP) to transfer content to or from one computer to another.

The device 102B can access the server 302, such as by using a standard web browser, and retrieve the content from the server 302 (e.g., automatically), such as in response to detecting a request to perform a paste has been issued. The device 102B can request content copied to the clipboard 308 or published to the server 302 (e.g., automatically) in response to the specified combination of keys being detected. In one or more embodiments, the server 302 or the device 102A can present the device 102B with a list of items that have been published to the server 302 or copied to the clipboard 308. The device 102A can allow a user to select which content copied to the clipboard 308 or published to the server 302 that the user wishes to paste to the device 102B.

The server 302 can include a decryption module 304 or a decompression module 306. The decryption module 304 can perform the same operations as the decryption module 116. The decompression module 306 can perform the same operations as the decompression module 118.

The device 102A, in the example of FIG. 3, can transfer virtually any amount of content to the server 302, thus eliminating nearly all limitations on the size of content 110 that can be transferred from the device 102A to the device 102B. The main limitation on the size of the content 110 that can be copied and pasted is an amount of storage available on the server 302 or the device 102A-B.

No machine-decodable image need be created in the example of FIG. 3, so the device 102B does not need to have the camera 106. The device 102B, in this example, just needs to be able to connect to the server 302 and know how to request the published or how to access the content published to the server 302. In one or more embodiments, this includes knowing the URL or a pointer to where the published content resides. The device 102B can decrypt or decompress the published content retrieved from the server 302, such as by using the decryption module 116 or the decompression module 118, respectively.

The server 302 can store the selected content for a predetermined or specified amount of time. The amount of time can be specified by a user of the device 102A or a master of the server 302. After the amount of time has expired the content can be deleted from the server 302 and the content may no longer be accessible through the server 302.

Figure 4:
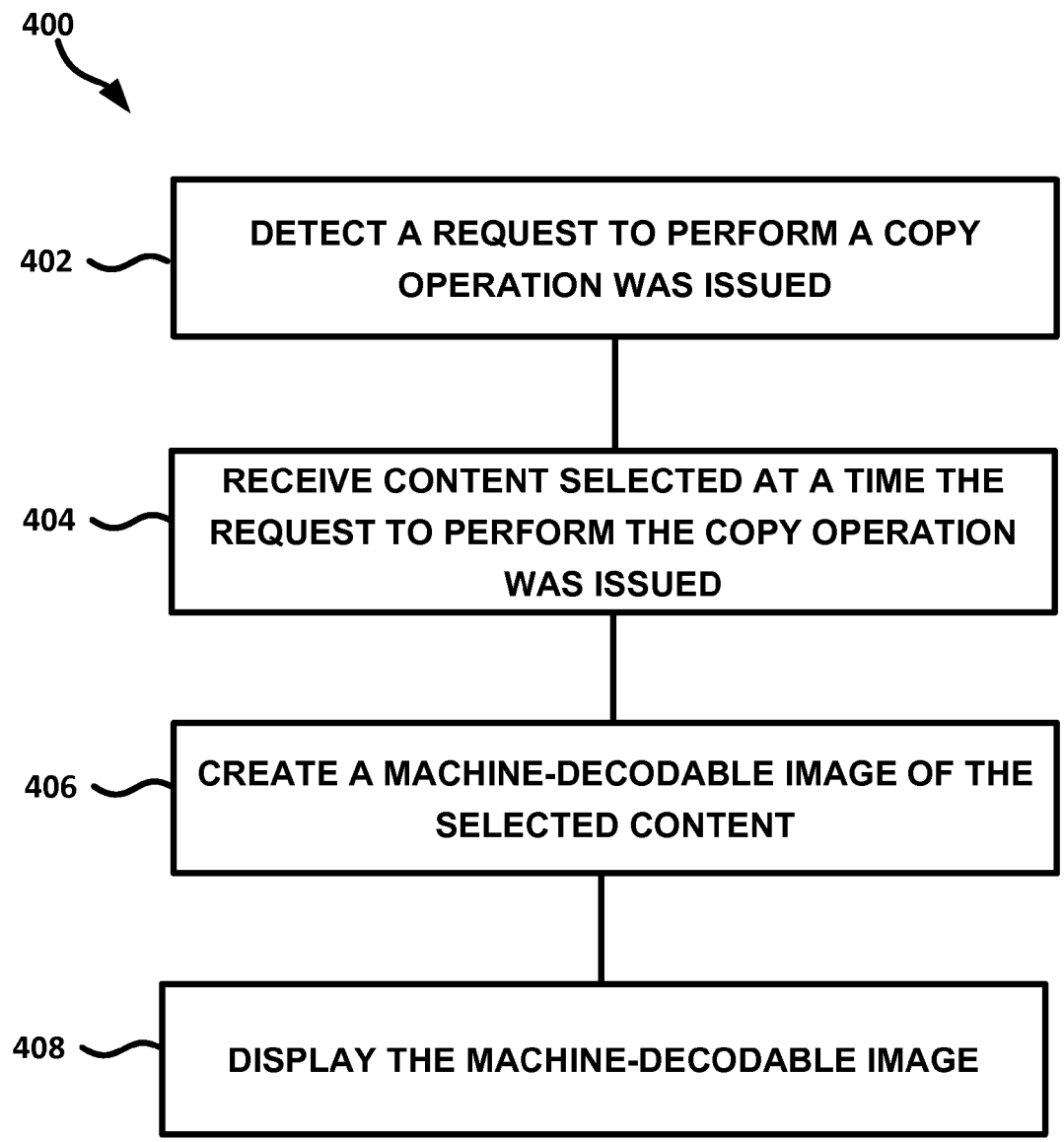
FIG. 4 illustrates a flow diagram of an example of a technique for transferring content between devices.

FIG. 4 shows an example of a technique 400 for transferring content 110 from one device 102A to another device 102B (e.g., copying the content 110 on one device 102A and pasting the content 110 into another device 102B). At 402, a request to perform a copy operation that has issued can be detected. At 404, content selected at a time the request to perform the copy operation was issued can be received. The technique 400 can include prompting a user to indicate whether a machine-decodable is to be created or not. At 406, a machine-decodable image of the selected content can be created (e.g., automatically (i.e. without user interaction) or in response to a user indicating that a machine-decodable image is to be created). At 408, the machine-decodable image can be displayed, such as to allow a camera to take a picture of the machine-decodable image. The machine-decodable image can be displayed in a manner suitable for photographing the machine-decodable image with a resolution sufficient to decode the content encoded therein.

The technique 400 can include determining a size of the selected content. The technique 400 can include determining if the size of the selected content is greater than a specified threshold. The technique 400 can include, in response to determining the size of the selected content is greater than the specified threshold, splitting the selected content into a plurality of chunks of content. Creating the machine-decodable image of the content can include creating a plurality of machine-decodable images, one machine-decodable image for each chunk of content of the plurality of chunks of content. The machine-decodable image can be a QR code or a two dimensional bar code. The specified threshold can be a maximum amount of content that can be embedded in the machine-decodable image minus an amount of content (e.g., metadata) to be inserted in the content before creating the machine-decodable image.

The technique 400 can include inserting metadata in a chunk of content of the plurality of chunks of content before creating the machine-decodable image of the chunk of content. The metadata can include content indicating how many machine-decodable images comprise the content or an index indicating which chunk of content of the plurality of chunks content the machine-decodable image corresponds to.

The technique 400 can include producing an image of each of the plurality of machine-decodable images. The technique 400 can include decoding each machine-decodable image of the plurality of machine-decodable images. The technique 400 can include recreating the content on a device that took a photograph of the machine-decodable images. The technique 400 can include encrypting or compressing the content before creating a machine-decodable image of the content. The technique 400 can include decrypting or decompressing the decoded content.

Figure 5:
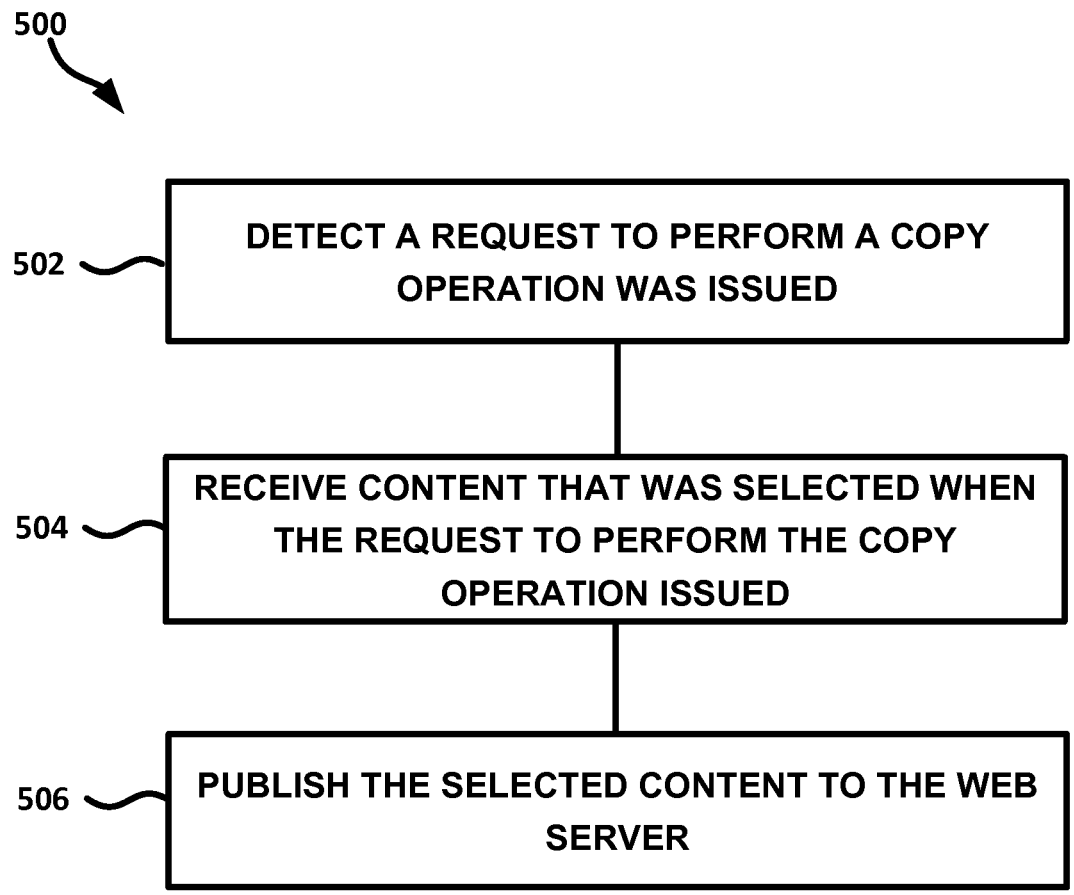
FIG. 5 illustrates a flow diagram of another example of a technique for transferring content between devices.

FIG. 5 shows an example of a flow diagram of another technique 500 for transferring content from one device 102A to another device 102B. At 502, a request to perform a copy operation can be detected. The request can be detected by a device that is coupled to a Local Area Network (LAN). At 504, content that was selected when the request to perform the copy operation issued can be received. The technique 500 can include prompting a user to indicate whether the content is to be published to the web server or not. At 506, the selected content can be published to a web server (e.g., automatically or in response to a user indicating that the content is to be published to the web server), such as in response to detecting the request to perform the copy operation was issued.

The technique 500 can include detecting, at another device, that a request to perform a paste operation was issued. The device can be coupled to the LAN. The technique 500 can include retrieving, using the computer network, the published content from the server, such as in response to detecting the request to perform the paste operation was issued.

The technique 500 can include determining if a permission group of the device that detected the paste operation issued matches a permission group of the content published to the server. The server or the device can allow the other device access to the content if the permission group matches or is higher than the permission group of the published content. If the permission group of the device does not match the permission group of the content or if the permission group of the device is lower than the permission group of the content, the server or the device can deny the device access to the content.

The technique 500 can include encrypting or compressing the content, by the server or the device, such as before publishing the content to the server. The technique 500 can include, by the server or the other device, decrypting or decompressing the decoded content, such as before or after the device retrieves the content from the server, respectively.

Figure 6:
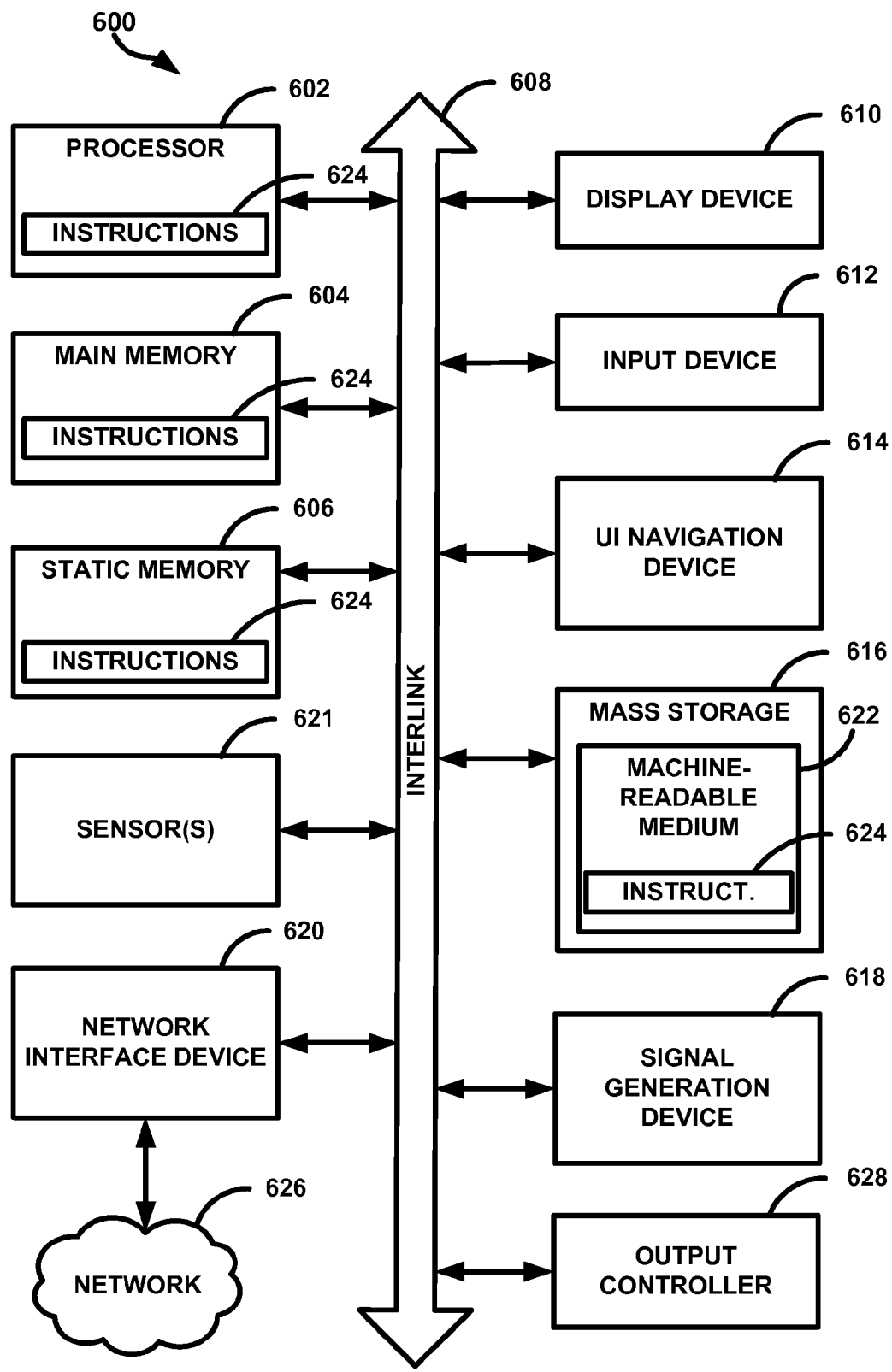
FIG. 6 illustrates an example of a computer system.

FIG. 6 illustrates a block diagram of an example machine 600 (e.g., device 102A-B or server 302) upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The flowchart(s) and block diagram(s) in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. One or more non-transitory machine-readable media having program code stored therein, the program code comprising instructions to:
   detect, at a first device, input to perform a paste operation;
   in response to detection of the input to perform the paste operation,
      transmit a request over a network to a second device to access selected content that has been published to a server within the second device after a copy operation in the second device, wherein a permission list has been defined by the second device and includes a list of other devices that have permission to access the selected content from the server;
      in response to transmission of the request,
         receive, from the second device, a list of different selected content to paste;
         display the list of different selected content to paste;
         receive selection of the selected content from the list of different selected content; and
   retrieve the selected content after the second device determines that first device is authorized to receive the selected content based, at least in part, on the first device being included in the permission list for the selected content.

2. The one or more non-transitory machine-readable media of claim 1, wherein the selected content is encrypted at the second device, wherein the program code comprises instructions to:
   decrypt the selected content after retrieval of the selected content.

3. A system comprising:
   a first apparatus to couple to a network, the first apparatus comprising,
      a server executable in the first apparatus;
      a first processor; and
      a first machine-readable medium comprising first machine executable code having stored thereon instructions executable by the first processor to cause the first apparatus to,
         receive input of selected content to be copied;
         receive input to perform a copy operation the selected content; and
         publish the selected content to the server in response to receipt of input to perform the copy operation; and
         define a permission list that comprises a list of other apparatuses that have permission to paste the selected content from the server; and
   a second apparatus to couple to the network, the second apparatus comprising,
      a second processor; and
      a second machine-readable medium comprising second machine executable code having stored thereon instructions executable by the second processor to cause the second apparatus to,
         receive input to perform a paste operation after the copy operation;
         in response to receipt of the input to perform the paste operation,
            transmit a request over the network to the first apparatus to access the selected content;
            in response to transmission of the request,
               receive from the second apparatus, a list of different selected content to paste;
               display the list of different selected content to paste;
               receive selection of the selected content from the list of different selected content; and
               retrieve the selected content after the first apparatus determines that second apparatus is authorized to receive the selected content based, at least in part, on the second apparatus being included in the permission list for the selected content.

4. The system of claim 3,
   wherein the first machine executable code comprises machine executable code having stored thereon instructions executable by the first processor to cause the first apparatus to encrypt the selected content, and
   wherein the first machine executable code having stored thereon instructions executable by the first processor to cause the first apparatus to publish the selected content comprises machine executable code having stored thereon instruction executable by the first processor to cause the first apparatus to publish the encrypted content.

5. The system of claim 4,
   wherein the first machine executable code comprises machine executable code having stored thereon instructions executable by the first processor to cause the first apparatus to compress the encrypted content, and
   wherein the first machine executable code having stored thereon instructions executable by the first processor to publish the encrypted content comprises machine executable code having stored thereon instructions executable by the first processor to cause the first apparatus to publish the compressed content.

6. The system of claim 5, wherein the second machine executable code comprises machine executable code having stored thereon instructions executable by the second processor to:
   decompress the compressed content; and
   decrypt the decompressed content.

7. A method comprising:
   detecting, at a first device, input to perform a paste operation;
   in response to detection of the input to perform the paste operation,
      transmitting a request over a network to a second device to access selected content that has been published to a server within the second device after a copy operation in the second device, wherein a permission list has been defined by the second device and includes a list of other devices that have permission to access the selected content from the server;
in response to transmission of the request,
receiving, from the second device, a list of different selected content to paste;
displaying the list of different selected content to paste;
receiving selection of the selected content from the list of different selected content; and
retrieving the selected content after the second device determines that first device is authorized to receive the selected content based, at least in part, on the first device being included in the permission list for the selected content.

8. The method of claim 7, further comprising:
decrypting the selected content after retrieval of the selected content.

\* \* \* \* \*